United States Patent [19]

Steinbrecher

[11] 4,426,605

[45] Jan. 17, 1984

[54] METHOD OF OPERATING A SHUNT-WOUND DC MOTOR AS WELL AS CONTROLLING DEVICE FOR THE EXECUTION AND APPLICATION THEREOF

[75] Inventor: Luigi Steinbrecher, Neuhausen, Switzerland

[73] Assignee: SIG Schweizerische Industrie-Gesellschaft, Switzerland

[21] Appl. No.: 324,319

[22] Filed: Nov. 23, 1981

[30] Foreign Application Priority Data

Jun. 5, 1981 [CH] Switzerland .................. 3701/81

[51] Int. Cl.³ .................................. H02P 5/06
[52] U.S. Cl. ........................... 318/347; 318/348; 318/349; 318/405
[58] Field of Search ............... 318/245, 296, 305, 317, 318/336, 338, 347–350, 357, 331, 358, 390, 395, 432, 514, 493, 405, 406, 339, 342, 344

[56] References Cited

U.S. PATENT DOCUMENTS

| | | | |
|---|---|---|---|
| 3,005,138 | 10/1961 | Scheer | 318/357 X |
| 3,950,684 | 4/1976 | Peterson | 318/406 X |
| 3,983,466 | 9/1976 | Safiuddin | 318/338 |
| 4,037,144 | 7/1977 | Ohmae et al. | 318/493 X |
| 4,099,111 | 7/1978 | Inaba et al. | 318/493 X |
| 4,247,807 | 1/1981 | Wilson | 318/338 |

FOREIGN PATENT DOCUMENTS 747687 4/1956 United Kingdom ............... 318/349

Primary Examiner—Ulysses Weldon
Attorney, Agent, or Firm—Lawrence Rosen

[57] ABSTRACT

So as to permit operating a shunt-wound motor with the series characteristic without the use of electronic armature current adjusters, it is proposed to start the motor (1) with the connection of start-up resistances ($R_1$–$R_4$) and to control each step added by means of a comparator by a minimum armature current value ($I_{A\ min\ o}$–$I_{A\ min\ 4}$) specifically predetermined for each step. After said minimum value specific to each step has been reached, the comparator (7) actuates a guide and a regulating switch ($S_w$, $S_x$), whereby the minimum armature current value so reached specific to the step is kept constant by means of adjusting the excitation ($I'_E$), and a limiting unit (17) prevents the exciting current ($I'_E$) from dropping below a predetermined minimum value ($I'_{E\ mn}$), which, at higher numbers of revolution (n), again leads to the shunt characteristic, now with reduced excitation ($I'_{E\ min}$) and the resistances ($R_1$–$R_4$) connected specific to each step, which prevents the motor from overspeeding (FIG. 1).

7 Claims, 2 Drawing Figures

METHOD OF OPERATING A SHUNT-WOUND DC MOTOR AS WELL AS CONTROLLING DEVICE FOR THE EXECUTION AND APPLICATION THEREOF

The present invention relates to a method of operating a shunt-wound DC motor having in its armature circuit an arrangement of a plurality of resistors capable of being switched in or out in stages, as well as to a controlling device for carrying out and applying said method.

STATE OF THE ART

Principally, with direct-current motors, a distinction can be drawn between two characteristic speed/torque curves. The following equation applies in general to stationary operation:

$$n = \frac{U}{4pw\phi} - \frac{R_A I_A}{4pw\phi} \quad (1)$$

wherein:
n = number of revolutions
U = terminal voltage on armature circuit
p = number of pairs of poles
w = number of turns between two brushes
$\phi$ = excitation flux
$R_A$ = armature resistance
$I_A$ = armature current Taking into account the expression for the torque M, namely $$M = \frac{2}{\pi} pwI_A\phi, \quad (2)$$

there follows therefrom with shunting of the motor a speed/torque dependency in accordance with:

$$n = \frac{U}{c\phi} - \frac{2\pi R_A}{c^2\phi^2} M \quad (3a)$$

with $c = 4pw$. \quad (4)

For the series-wound motor, for which we can write:

$$\phi = kI_A \quad (5)$$

there follows for the speed/torque dependency the following expression:

$$n = \frac{U}{c_R\sqrt{M}} - \frac{2\pi R_A}{c_R^2} \quad (3b)$$

with $c_R = \sqrt{8\pi pwk}$

The comparison between (3a) and (3b) shows that with the shunt-wound motor, the number of revolutions or speed increases linear with the decrease in torque M, whereas in connection with the series-wound motor, it increases hyperbolically with $1/\sqrt{M}$. This last-mentioned, so-called "soft" speed/torque characteristic produces a favorable operational behavior in a stationary operation particularly when such a motor is used for driving the vehicle, whereas with the so-called "hard" shunt characteristic as per (3a), good starting behavior is achieved by selecting the steepness of the characteristic accordingly.

Now, it is known from the article "Heavy Industrial Locomotive with Thyristor Current Converters" published in "ELEKTRISCHE BAHNEN", 1967, No. 10, to guide or control a compound-wound motor with the characteristic of the shunt-wound motor—which, per se, is also "hard"—in such a way that said compound-wound motor has the "soft" speed/torque characteristic corresponding with the one of the series-wound motor. This is achieved by controlling the field in such a way that it follows the course of the armature current. Once the source voltage above the armature has reached a minimum value, the field follows that armature voltage, and due to the weakening of the field, the armature terminal voltage is controlled or adjusted to said constantly maintained minimum value of the source voltage. In this way, the compound-wound motor is operated in accordance with the "soft" speed/torque characteristic which is favorable to the driving operation, however, on the other hand, its actually favorable starting behavior according to the "hard" characteristic in accordance with (3a) is lost in this way.

It has been proposed in German laid-open patent specification 1 926 980 to control a shunt-connected DC motor with the series characteristic. This is achieved by adjusting the armature current in a lower speed range to a predetermined controlling quantity, whereby the excitation is changed with the armature current. If after reaching a defined number of revolutions, the armature current is no longer capable of following the controlling quantity, the field starts to weaken.

Therefore, by using the above, known techniques, the shunt-wound motor is converted in terms of characteristics into a series-wound motor, however, at the expense of losing the shunt characteristic, which is desirable under certain operating conditions, for example for starting. Now, a method has been disclosed in German published patent disclosure DE-OS 2 934 316 by the same applicant, which permits operating a shunt-wound motor selectively with the shunt or series characteristic depending on which characteristic is optimally suitable under the given operating conditions. In particular, the driving motor is operated in such a way that below a predetermined number of revolutions, it is driven with the shunt-characteristic, and with the series-characteristic above said number of revolutions.

Although an optimal starting, driving and braking behavior of the motor is achieved by the last-mentioned method, also this technique—like those employed in the other, afore-cited references, makes use of armature current converters or thyristor-controlled d.c. pulse converters. Such current converters and the electronic control associated therewith requires a considerable expenditure due to the quantity of the armature current. If defects occur in such systems, the necessary repair work must be carried out practically on site by highly qualified service personnel; otherwise, voluminous parts have to be removed and must be shipped to a plant equipped for such repair work, which is extremely disadvantageous, for example in cases in which such drives are used for locomotives operated in mines: in particular here, the objective must be to enable less qualified service personnel to repair the drive on site, for example by exchanging the defective functional blocks, like modules are replaced.

DESCRIPTION OF THE INVENTION

The problem of the present invention lies in operating a shunt-wound motor in such a way that the series characteristic is achieved under practically any stationary load; furthermore, that for starting purposes, the shunt characteristic may be exploited without requiring armature current converters or electronic adjusting elements for the armature current in general. This means that the complex, relatively voluminous electronic armature current controller is omitted, while the series and shunt characteristics, however, are both available and exploitable, depending on the operating conditions.

This is achieved by a method of the type specified in the paragraph immediately preceding this one in the following way: an armature current minimum value is predetermined for each of at least two resistor stages, and the armature current is kept constant by means of field control once said minimum value has been reached.

As explained hereinafter in greater detail, this produces a field of speed/torque characteristics, of which each rises linear with the decrease in torque in the lower range of revolutions in conformity with the characteristic of a shunt-wound motor with armature resistors capable of being switched on or switched off, and then changes into the hyperbolic course at the torque defined in a given case and corresponding with the minimum value predetermined for the armature current. Owing to the fact that each characteristic of the field exhibits this basic course or development corresponding with the associated resistors, it is possible to exploit the soft series characteristic under practically any load.

So as to avoid in any case the danger of overspeed as loads increase, which is a known hazard in connection with series-wound motors, it is proposed, furthermore, to predetermine at least one excitation minimum value and to maintain the field constant after said minimum value has been reached and the number of revolutions rises further. This means that in the upper speed ranges, the motor will change again to the shunt characteristic, however, now with a weakened field.

A controlling device for carrying out this method is characterized in that a current measuring arrangement is provided in the armature circuit, the output of which is supplied to a comparator circuit; that said comparator circuit is capable of being connected to at least two reference signal sources coupled with resistor stage switches; and that the output of the comparator circuit controls an armature current/excitation control by activating or deactivating said control, whereby preferably one reference signal source is added to said control as the source "guiding" the armature current.

A further development of the controlling device provides that a limiting unit is provided in the excitation control circuit, said unit preventing the excitation from dropping below at least one predeterminable minimum value.

The proposed method is particularly suitable for application in battery-powered vehicles, in particular for locomotives operated in mines.

BRIEF DESCRIPTION OF THE DRAWINGS

The invention is explained in the following by way of example with the help of figures, of which.

DESCRIPTION OF THE INDIVIDUAL FIGURE

Figure 1:
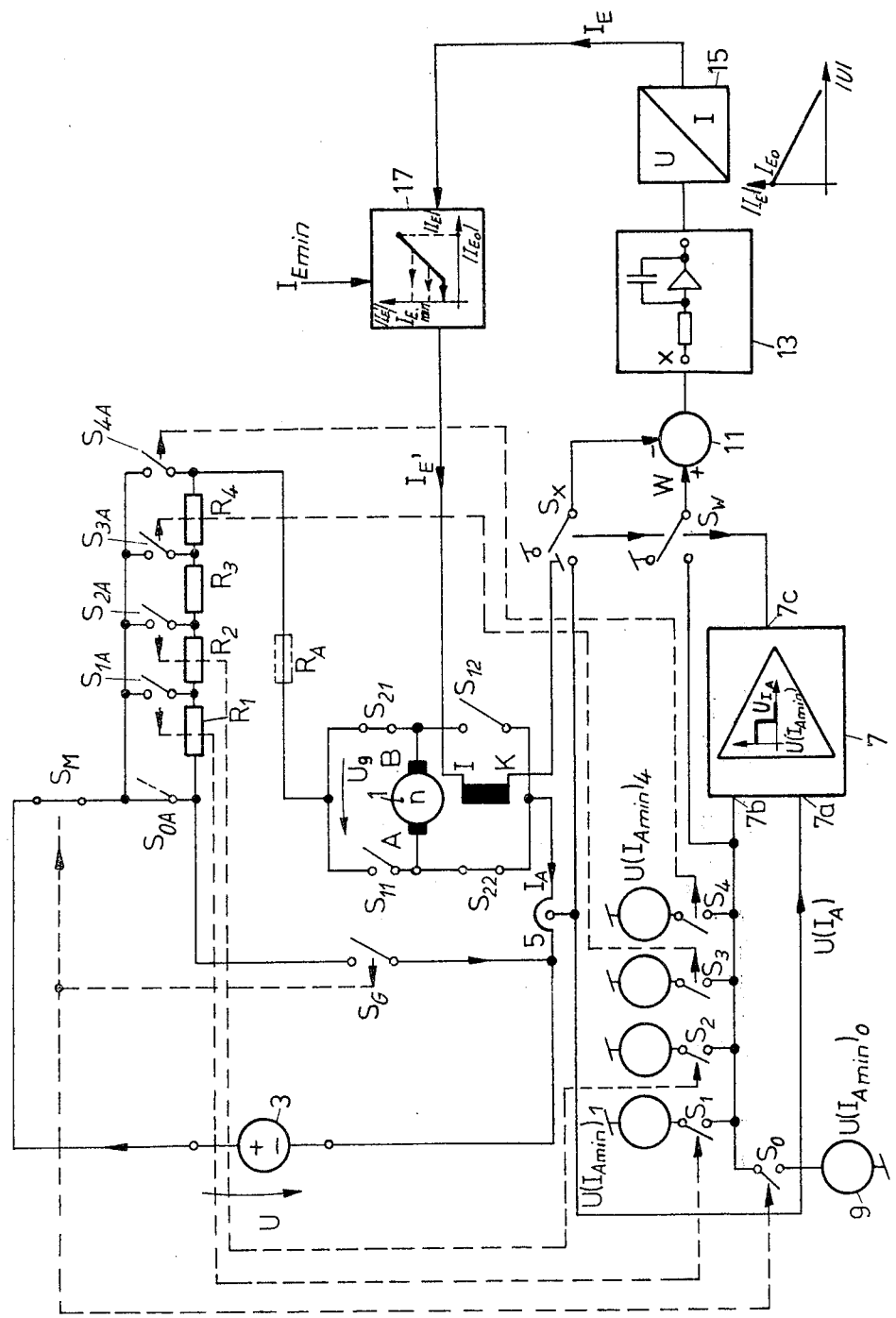
FIG. 1 shows a functional block diagram of the controlling device according to the invention.

According to FIG. 1, a d.c. motor 1 has an armature AB as well as an externally excited shunt winding IK. The armature AB is connected to the armature feeder 3 by way of directional switches $S_{11}/S_{12}$ and $S_{21}/S_{22}$ for the armature current, said switches being coupled in pairs. The armature current circuit is closed by means of a "motor" operating switch $S_M$ by way of feeder 3. In the braking operation, said armature circuit is closed within itself and disconnected from feeder 3, namely by a "generator" operating switch $S_G$ and while switch $S_M$ opens simultaneously. During the operation of the motor and also during the braking generator operation, four resistors (by way of example) $R_1$–$R_4$ in the armature current circuit are capable of being switched on or off with the help of step switches $S_{1A}$–$S_{4A}$. The armature current $I_A$ is measured by means of a current transformer 5, which supplies a signal $U(I_A)$ corresponding with the armature current to a first input end 7a of a comparator circuit 7.

The second input end 7b of said comparator circuit 7 is capable of being connected to a number of reference signal sources 9, with signals $U(I_{A\ min})_0$ to $U(I_{A\ min})_4$. Said sources 9 are selectively added or switched to the comparator input end 7b by way of switches $S_0$ to $S_4$. As shown by the dashed line, the switch $S_0$ switches the signal $U(I_{A\ min})_0$ to input end 7b if the highest resistor stage $R_{S0}$ of the start-up resistors is switched in the armature circuit, i.e., $R_{S0}=R_1+R_2+R_3+R_4$, the latter by actuating the "motor" operating switch $S_M$ or a separate switch $S_{0A}$.

The following reference signals $U(I_{A\ min})_1$–$U(I_{A\ min})_4$ are added to input 7b analogously if the first, second, third or fourth resistance stage $R_{S1}$, $R_{S2}$, $R_{S3}$, $R_{S4}$ is switched in correspondingly, said stages adding up to:

$R_{S1}=R_2+R_3+R_4$
$R_{S2}=R_3+R_4$
$R_{S3}=R_4$
$R_{S4}=0$ (or = resistance of the armature).

In each case, only the source 9 of which the corresponding resistance stage is effective, is switched to 7b.

As soon as the signal $U(I_A)$ corresponding with the actual value of the armature current meets on input end 7a with the reference signal $U(I_{A\ min})$ effective at that time, the output end 7c of the comparator circuit 7 or the signal appearing at said end activates two switches $S_x$ and $S_w$, whereupon the regulating switch $S_x$ connects the output of transformer 5 to an input end of a comparing unit 11, whereas the guide switch $S_w$ then switches the input end 7b of comparator 7 to the second input end of comparing unit 11, and with it the source 9 that was just added. The output of said comparator unit 11 is supplied to a controller 13, which preferably is a PI- or PID-controller, the output of which is connected to a voltage/current transformer 15. The qualitative characteristics below said transformer 15 show that it is designed in such a way that the output current decreases as the amount of input signal rises based on the maximum output current $I_{E0}$ at input voltage "zero". The output of transformer 15 supplies the exciting winding IK with the exciting current $I_E$.

Figure 2:
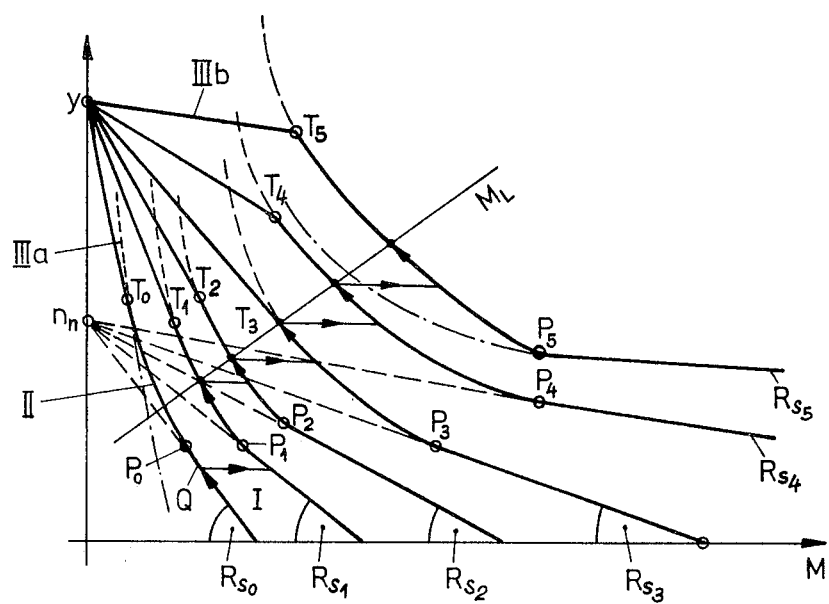
FIG. 2 shows qualitatively the field of the speed/torque-characteristics achieved in the present system.

The resulting characteristic of the controlling device specified above is explained with the help of the field of characteristics shown in FIG. 2.

For starting, the highest resistance step $R_{S0}$ is activated in the armature circuit of the motor. The switch $S_0$ is closed simultaneously and connects the reference signal $U(I_{A\ min})_0$ to the input end $7b$ of comparator circuit 7. The motor starts on branch I of the characteristics with the shunt characteristic in accordance with the connected resistance step $R_{S0}$. The armature current $I_A$ due to source voltage $U_Q$ which rises with the number of revolutions, decreases and with it also torque M.

As long as $I_A < I_{A\ min\ 1}$, $S_x$ and $S_w$ are switched to zero: the exciting current is constant $I_{E0}$. Once the armature current has reached the value $I_{A\ min\ o}$, for example at point $P_0$ in FIG. 2, which value is determined by reference signal $U(I_{A\ min})_o$, the comparator 7 closes the excitation control by closing guide and regulating switches $S_x$ and $S_w$. In this way, the actual and the rated values of the armature current are switched to comparing unit 11. By way of controller 13 and voltage transformer 15, the exciting current $I_E$ is adjusted in such a way that the armature current will not drop below $I_{A\ min\ o}$.

If equation (1) is solved according to excitation $\phi$, there follows:

$$\phi = \frac{1}{n}\left[\frac{U}{4pw} - \frac{R_A I_A}{4pw}\right]$$

which shows that the excitation is adjusted for keeping the step-specific minimum armature current $I_{A\ min}$ constant. Inserting this term as well as the minimum armature current values in equation (2) results in the torque/speed-dependency:

$$M = \frac{2}{\pi}[U - R_A \cdot I_{A\ min}]I_{A\ min} \cdot \frac{1}{n} \quad (8)$$

Contrary to the normal shunt characteristic, the motor is picking up speed after $P_0$ on a branch II, which is proportional to $1/M$. If the load torque would not stabilize the motor with $M_L$ as shown in FIG. 2, it would overspeed according to characteristic branch IIIa.

The characteristics conforming to the added resistance steps $R_S$ are plotted in FIG. 2 with points $P_1$–$P_5$, at which the circuit shown in FIG. 1 keeps the minimum armature current constant by means of field weaknesses.

FIG. 2 shows the development in the field of characteristics, for example when starting the motor against a load torque $M_L$. On branch I, the operator decides to switch at point $Q_1$ to the next smaller resistance step $R_{S1}$, i.e., before the armature current/excitation control has started at $R_{S0}$. Once point $P_1$ has been reached in accordance with armature current $I_{A\ min\ 1}$ in FIG. 1, the control starts and guides the motor to the stable operating point at $R_{S1}$ on load characteristic $M_L$. If the operator decides to accelerate further, he switches in the next lower resistance step $R_{S2}$. The figure shows that this permits switching directly to the hyperbolic branch of the next characteristics, i.e., control is not discontinued at the "jump" shown from $R_{S1}$ to $R_{S2}$, but the quantity guiding the armature current merely changes from $U(I_{A\ min})_1$ to $U(I_{A\ min})_2$.

For braking, the main motor switch $S_M$ is opened and generator switch $S_G$ is made, whereupon the resistance steps $R_{S4}$ to $R_{S0}$ are successively added. In doing so, the excitation is preferably raised again to its maximum value in accordance with $I_{E0}$ by opening switches $S_x$ and $S_w$, and kept constant in any case.

Now, so as to prevent the motor from overspeeding in accordance with curve branch IIIa, a limiting unit 17 is connected to the excitation control circuit as shown in FIG. 1, which unit permits the current $I_E$ to decrease only to a predetermined minimum value $I'_{E\ min}$, as indicated by the plotted characteristic of its output current $I_E$ opposite input current $I_E$. Said minimum value may either be uniform for all resistance steps $R_S$ or specific to each step.

FIG. 2 shows that the motor then changes again to the shunt characteristic at operating points T, namely in accordance with (3a) in conformity with the added armature resistance step $R_S$ and as determined by exciting current $I'_{E\ min}$, which is not falling below the minimum value. FIG. 2 shows the field of characteristics obtained qualitatively if a common minimum excitation value $I'_{E\ min}$ is provided for all steps $R_S$, because in that case, only the resulting branches IIIb of the shunt characteristic intersect at M=O at a point on the n-axis.

The voltage/current transformer 15 may be provided in the form of a transistorized unit because of the relatively low quantity of the exciting current, i.e., as a transistor power source. The limiting unit 17 is designed as a known functional network with semiconductor elements, in particular limiting diodes.

For maintaining the declining voltage/current characteristic, it is possible to add, for example a reference voltage $U_{E0}$ and the output voltage of controller 13 to a difference amplifier, whose output $U_a = k(U_{E0} - U_{13})$ controls a transistor power source, with k being its amplification and $U_{13}$ being the controller output voltage. If the field is not turned over (change of poles) during braking operations, which is the case with the specified arrangement, the power source may be designed for one current polarity.

Finally, it is necessary to point out that the armature current/excitation control herein specified offers an additional advantage over the conventional series characteristic: the series characteristic plotted by way of example in FIG. 2, with $1/\sqrt{M}$, takes a considerably flatter course than the $1/M$ characteristic achieved with the known control. This makes it possible to cover the operating field with a few step-specific characteristics, because the number of revolutions rises relatively strongly as the torque decreases. In light of the fact that no armature current adjusters are required for the proposed method or for the controlling device for carrying out said method, it is possible to design the entire control electronics—which is limited to determining the armature current and adjusting the excitation—in the form of exchangeable modules. Therefore, particularly in the case of battery-powered locomotives used in mines, the user can store a number of reserve controls for replacing any damaged unit without shutdowns for repair work.

What is claimed is:

1. A controlling device for controlling a shunt-wound DC-motor having a field and an armature in operative relation with the field, said device comprising:
   current measuring means (5) for measuring current in the armature;
   variable reference signal generating means (9);
   comparator means (7), said current measuring means (5) and said generating means (9) having outputs connected to inputs of said comparator means;

an energizing circuit for the armature including variable resistance means (R1, R2, R3, R4);

control means($S_{1A}$, $S_{2A}$, $S_{3A}$, $S_{4A}$, $S_{0A}$, $S_0$, $S_1$, $S_2$, $S_3$, $S_4$) for controlling said variable resistance means and said generating means;

controllable field excitation current actuating means (13, 15, 17) for establishing field excitation current of predetermined value, said field excitation current being adjustable by a control signal applied to said actuating means (13, 15, 17) at a control input thereof;

switching means ($S_X$, $S_W$) controlled by the output of said comparator means (7c);

difference forming means (11) having a first input connectable by said switching means ($S_W$) to said generating means (9) at its output, said difference forming means also having a second input connectable by said switching means ($S_X$) to said current measuring means (5) at its output, and said difference forming means producing an output that acts as a control difference signal applied to said control input of said excitation current actuating means (13, 15, 17) as a regulator for the current in the armature.

2. A controlling device according to claim 1 also comprising current minimum-value limiting means (17) for the field excitation current.

3. A control device according to claim 2 in which the limiting means includes a limit value control input to which a resistance value dependent signal ($I_{Emin}$) is applied.

4. A control device according to claim 1 in which the variable resistance means includes at least two resistors (R1, R2) selectably switchable into the energizing circuit for the armature, and said generating means including at least two selectably switchable fixed signal sources ($U(I_{Amin})$).

5. A method for operating a shunt-wound DC-motor having a field and an armature in operative relation with the field, said method comprising the steps of:

switching resistor means of variable value into a first energizing circuit for the armature;

producing a first signal related to actual current in said armature;

producing a second signal related to the value of said resistor means;

comparing said first signal with said second signal;

maintaining excitation of said field constant until the first signal reaches a value bearing a predetermined relationship to said second signal;

and thereafter switching said second signal into an armature current feedback control loop which utilizes said second signal as a rated armature current signal in said loop to control excitation current in said field as a regulated quantity.

6. A method according to claim 5 also comprising the step of limiting the excitation current to a predetermined minimum limit value.

7. A method according to claim 5 also comprising the step of limiting the excitation current to a minimum limit value that is a function of the value of said resistor means.

* * * * *